(12) United States Patent
Yokoi

(10) Patent No.: US 9,008,520 B2
(45) Date of Patent: *Apr. 14, 2015

(54) VISIBLE LIGHT COMMUNICATION SYSTEM AND METHOD

(71) Applicant: Samsung Electronics Co., Ltd., Gyeonggi-do (KR)

(72) Inventor: Atsuya Yokoi, Kanagawa (JP)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,444

(22) Filed: Apr. 2, 2013

(65) Prior Publication Data

US 2013/0279919 A1    Oct. 24, 2013

Related U.S. Application Data

(63) Continuation of application No. 13/124,764, filed as application No. PCT/KR2009/005964 on Oct. 16, 2009, now Pat. No. 8,433,203.

(30) Foreign Application Priority Data

Oct. 17, 2008  (JP) ................. 2008-268490

(51) Int. Cl.
  *H04B 10/04*  (2006.01)
  *H04B 10/06*  (2006.01)
  (Continued)

(52) U.S. Cl.
  CPC .......... *H04B 10/116* (2013.01); *H04B 10/1149* (2013.01)

(58) Field of Classification Search
  CPC ............ H04B 10/1149; H04B 10/116; H04L 1/0057; H04L 12/26; H04L 12/2861; H04L 12/2865; H04L 12/2898; H04L 12/4641; H04L 1/00; H04L 1/0003; H04L 1/0071; H04L 1/0076; H04L 1/205; H04L 25/0202; H04L 25/49; H04L 27/223
  USPC ............ 398/172, 182, 158, 118–140, 183, 25
  See application file for complete search history.

(56) References Cited

U.S. PATENT DOCUMENTS 5,822,099 A * 10/1998 Takamatsu ............... 398/162
6,442,145 B1 *  8/2002 De Lange et al. ......... 370/310

(Continued)

FOREIGN PATENT DOCUMENTS

| CN | 101232329 | 7/2008 |
| JP | 2003318836 | 11/2003 |

(Continued)

OTHER PUBLICATIONS

PCT/ISA/237 Written Opinion issued on PCT/KR2009/005964 (4 pp.) May 25, 2010.

(Continued)

*Primary Examiner* — Ken Vanderpuye
*Assistant Examiner* — Abbas H Alagheband
(74) *Attorney, Agent, or Firm* — The Farrell Law Firm, P.C.

(57) ABSTRACT

Disclosed is a visible light communication system including a transmission device, including multiple light emitting units emitting light of different colors and mapping transmission data to a chromaticity point, calculating luminescence of each of the light emitting units, generating a preamble signal for channel matrix estimation, and emitting light based on the preamble signal and calculated luminescence amount. A reception device of the visible light communication system includes multiple light receiving units and estimates a channel matrix based on a corresponding optical signal when an optical signal corresponding to the preamble signal is received in each light receiving unit, compensates the optical signal corresponding to the chromaticity point for a propagation path based on the estimated channel matrix, detects a chromaticity point on the chromaticity coordinates based on a signal after the propagation path compensation, and demodulates the transmission data.

11 Claims, 10 Drawing Sheets

(51) Int. Cl.
  *H04B 10/00* (2013.01)
  *H04B 10/116* (2013.01)
  *H04B 10/114* (2013.01)

(56) References Cited

U.S. PATENT DOCUMENTS

| | | | |
|---|---|---|---|
| 6,594,388 B1* | 7/2003 | Gindele et al. | 382/167 |
| 7,075,225 B2* | 7/2006 | Baroky et al. | 313/503 |
| 7,664,402 B2* | 2/2010 | Katsuki et al. | 398/140 |
| 7,689,130 B2* | 3/2010 | Ashdown | 398/172 |
| 7,877,018 B2* | 1/2011 | Ann | 398/172 |
| 7,889,999 B2* | 2/2011 | Ann | 398/172 |
| 8,195,054 B2* | 6/2012 | Son et al. | 398/172 |
| 2006/0153062 A1* | 7/2006 | Tanabe et al. | 370/208 |
| 2006/0226956 A1* | 10/2006 | Young et al. | 340/286.01 |
| 2006/0239689 A1* | 10/2006 | Ashdown | 398/130 |
| 2008/0181614 A1* | 7/2008 | Ann | 398/140 |
| 2008/0298811 A1* | 12/2008 | Son et al. | 398/172 |
| 2009/0059880 A1* | 3/2009 | Kuroda | 370/338 |
| 2009/0129781 A1* | 5/2009 | Irie et al. | 398/98 |
| 2009/0154585 A1* | 6/2009 | Lee et al. | 375/267 |
| 2009/0180780 A1* | 7/2009 | Ann et al. | 398/128 |
| 2009/0268836 A1* | 10/2009 | Zhao et al. | 375/267 |
| 2010/0034540 A1* | 2/2010 | Togashi | 398/118 |
| 2011/0200338 A1 | 8/2011 | Yokoi | |
| 2012/0250788 A1* | 10/2012 | Walton et al. | 375/295 |
| 2012/0275796 A1 | 11/2012 | Yokoi | |
| 2012/0281661 A1* | 11/2012 | Kuroda | 370/329 |
| 2013/0279919 A1 | 10/2013 | Yokoi | |

FOREIGN PATENT DOCUMENTS

| | | |
|---|---|---|
| JP | 2006080906 | 3/2006 |
| JP | 2006-174120 | 6/2006 |
| JP | 2007013484 | 1/2007 |
| JP | 2007096548 | 4/2007 |
| JP | 2007166526 | 6/2007 |
| JP | 2007-274091 | 10/2007 |
| JP | 2007259111 | 10/2007 |
| JP | 2008252570 | 10/2008 |
| JP | 2010-098574 | 4/2010 |
| JP | 2011-114634 | 6/2011 |
| JP | 5325526 | 7/2013 |

OTHER PUBLICATIONS

PCT/ISA/210 Search Report issued on PCT/KR2009/005964 (3 pp.) May 24, 2010.

\* cited by examiner

Chromaticity Coordinates Multiplexing Method
In Case Of 16 Values (4 Bits Multiplexing)

| Chromaticity Point | Digital Value |
|---|---|
| S0 | 0x0 |
| S1 | 0x1 |
| S2 | 0x2 |
| S3 | 0x3 |
| S4 | 0x4 |
| S5 | 0x5 |
| S6 | 0x6 |
| S7 | 0x7 |
| S8 | 0x8 |
| S9 | 0x9 |
| S10 | 0xA |
| S11 | 0xB |
| S12 | 0xC |
| S13 | 0xD |
| S14 | 0xE |
| S15 | 0xF |

FIG.3

VISIBLE LIGHT COMMUNICATION SYSTEM AND METHOD

PRIORITY

This application is a Continuation application of U.S. patent application Ser. No. 13/124,764, which was filed in the U.S. Patent and Trademark Office on Apr. 18, 2011, and claims priority under 35 U.S.C. §119(a) to Patent Application No. 268490/2008 filed in the Japanese Intellectual Property Office on Oct. 17, 2008, and to PCT/KR2009/005964 filed Oct. 16, 2009, the contents of each of which are incorporated herein by reference.

BACKGROUND OF THE INVENTION

1. Field of the Invention

The present invention relates to a visible light communication system and method for use thereof, and more particularly to an improved visible light communication system and method for reducing influence of a propagation characteristic on a light propagation path and improving transmission quality.

2. Description of the Related Art

Recent light communication technology uses light in a visible region, especially for light emitting devices such as a Light Emitting Diode (LED) to achieve a more convenient and higher-rate data communication using an infrastructure of a lighting device installed inside or outside of a building.

Considering the influence on a human body or on a medical device, the LED is the strongest candidate for a light emitting means for high rate optical data communication. Meanwhile, a semiconductor light emitting device, such as a Laser Diode (LD) or a Super Luminescent Diode (SLD), which responds at a higher rate, can also be a candidate. The data transmission rate for optical communication depends on a response speed of the light emitting device. Accordingly, high response speeds of the light emitting device have been noted. In order to further improve the data transmission rate, technology for stably transmitting more data in a single signal that is emitted by the light emitting device is required.

In regard to the aforementioned optical communication technology, for example, Japanese Patent Publication No. 2003-318836 discloses multiple signals being determined according to a light emitting power of multiple LEDs emitting three colors, Red, Green, and Blue, of light ("RGB") and input data is assigned based on multiple numbers, so that the communication is efficiently performed while maintaining a white color. Further, Japanese Patent Publication No. 2007-166526 discloses a correction frame inserted in a two-dimensional transmission/reception cell to reduce the influence of a background light or a noise.

However, such conventional technologies do not allow a multiplicity that is larger than the number of light sources and limit the achievable high speed of the data transmission. Further, the transmission quality is greatly deteriorated due to the reduction of a luminescence amount in a propagation path, the mixing of ambient light, a light emitting property of a light source, and a color separation sensitivity of a light receiving device.

The present invention addresses the above-mentioned problems and provides a visible light communication system and method to reduce the influence of a propagation characteristic in a light propagation path and improve a transmission quality.

SUMMARY OF THE INVENTION

In accordance with an aspect of the present invention, there is provided a visible light communication system including a transmission device and a reception device.

The transmission device includes multiple light emitting units to emit different colors of light; a luminescence controller to modulate transmission data in combination with a color emitted from each of the multiple light emitting units and to calculate a luminescence amount of each of the multiple light emitting units so that a color corresponding to the combination of a corresponding color is radiated; a preamble signal generator to generate a preamble signal using an estimation of a channel matrix; and a light emission controller to control the luminescence amount of each of the multiple light emitting units based on the generated preamble signal and to simultaneously emit signals from each of the light emitting units according to the luminescence amount calculated by the luminescence amount controller.

The reception device includes multiple light receiving units to receive optical signals of different colors; a channel estimation unit to estimate the channel matrix based on a corresponding optical signal when an optical signal corresponding to the preamble signal is received by each of the multiple light receiving units; a propagation path compensation unit to compensate the corresponding optical signal for a propagation path based on the estimated channel matrix when an optical signal corresponding to the combination of colors received by the light receiving units; and a data demodulator to detect the combination of the colors and to demodulate the transmission data based on a signal output from the propagation path compensation unit.

The transmission device further includes a chromaticity coordinate modulator to match the transmission data to a predetermined chromaticity point arranged on chromaticity coordinates. The luminescence calculator calculates a luminescence amount of each of the light emitting units so that a color corresponding to the chromaticity point matched with the transmission data by the chromaticity coordinate modulator is radiated. The propagation path compensation unit compensates the corresponding optical signal for the propagation path based on the channel matrix estimated by the channel estimation unit when the optical signal corresponding to the chromaticity point is received in each of the light receiving units. The data demodulator detects the chromaticity point on the chromaticity coordinates and demodulates the transmission data based on the signal output from the propagation path compensation unit. As such, in the visible light communication system, the transmission data is matched to the chromaticity point on the chromaticity coordinates by the chromaticity coordinate modulator and is modulated. That is, the transmission data is modulated by a ratio of each color. Therefore, even if the luminescence amount is reduced in the propagation path, information included in the optical signal is not lost, so that it is difficult to generate the deterioration of the transmission quality according to the luminescence amount reduction.

The preamble signal includes a synchronization code component used for a timing synchronization and a channel estimation code component which is used for a channel estimation. The preamble signal generator generates the preamble signal corresponding to each of the light emitting units. The light emission controller controls each of the light emitting units based on the corresponding preamble signal. The synchronization code component of the preamble signal corresponding to one light emitting unit and the synchronization code component of the preamble signal corresponding to another light emitting unit have are identical. The channel estimation code component of the preamble signal corresponding to one light emitting unit and the channel estimation code component of the preamble signal corresponding to another light emitting unit are orthogonal with each other. By using the aforementioned preamble signal, it is possible to detect the synchronization timing from the synchronization code component and detect a position and existence of a signal continuously included in the synchronization code.

The reception device further includes a correlation value calculator to generate a sample signal having a waveform identical to a waveform of the synchronization code component of the preamble signal and calculates a correlation value while sliding a timing of an optical signal received in each of the light emitting units and a timing of the sample signal on each other; and a synchronization timing detector to detect a timing at which a correlation value calculated by the correlation value calculator exceeds a predetermined value. Taking the correlation characteristic of each of the signal component into consideration, it is possible to the synchronization timing based on the synchronization code component.

Further, the propagation path compensation unit applies a weight matrix (W) calculated based on the channel matrix (H) to the optical signal and compensates the corresponding signal for the propagation path. For example, the weight matrix W is $W=(H \times H^H)^{-1} \times H^H$. The method has a comparatively low calculation load, so that it is possible to execute the high-rate compensation for the propagation path. Further, each of the components of the channel matrix H in the visible light communication is a real number, so that the load is smaller and thus the high-rate compensation can be realized.

In accordance with an aspect of the present invention, there is provided a visible light communication method in a visible light communication executed between a transmission device including multiple light emitting units emitting light of different colors and a reception device including multiple light receiving units receiving optical signals corresponding to different color.

In the visible light communication method, the transmission device modulates transmission data in a combination with a color emitted from each of the multiple light emitting units and calculates a luminescence amount of each of the multiple light emitting units so that a combination of corresponding colors are radiated; generates a preamble signal using an estimation of a channel matrix; controls a luminescence amount of each of the multiple light emitting units based on the generated preamble signal simultaneously emitted from each of the multiple light emitting units according to the calculated luminescence amount, and the reception device estimates the channel matrix based on a corresponding optical signal when an optical signal corresponding to the preamble signal is received in each of the multiple light receiving units; compensates the corresponding optical signal for a propagation path based on the estimated channel matrix when an optical signal corresponding to the combination of colors is received in each of the multiple light receiving units; detecting a color in which the combination of colors based on the optical signal of the propagation path; and demodulates the transmission data based on the detected combination of colors.

In the visible light communication system and method, the preamble signal used for the estimation of the channel matrix is added to the optical signal and transmitted. Further, the propagation path compensation is executed to the optical signal based on the channel estimation estimated using the preamble signal. The channel matrix represents a propagation characteristic of the light propagation path. Therefore, it is possible to remove the propagation path characteristic from the optical signal by using the channel matrix. Therefore, it is possible to remove the propagation path characteristic from the optical signal by using a Zero Focusing (ZF) method, effectively reducing deterioration of the transmission quality.

Accordingly, the visible light communication system and method of the present invention can reduce the influence of the propagation characteristic on the light propagation path and improve the transmission quality.

BRIEF DESCRIPTION OF THE DRAWINGS

The above and other aspects, features and advantages of the present invention will be more apparent from the following detailed description taken in conjunction with the accompanying drawings, in which:

FIG. 3 is a chart of chromaticity coordinates of the multiplexing scheme;

DETAILED DESCRIPTION OF THE PREFERRED EMBODIMENTS

Figure 1:
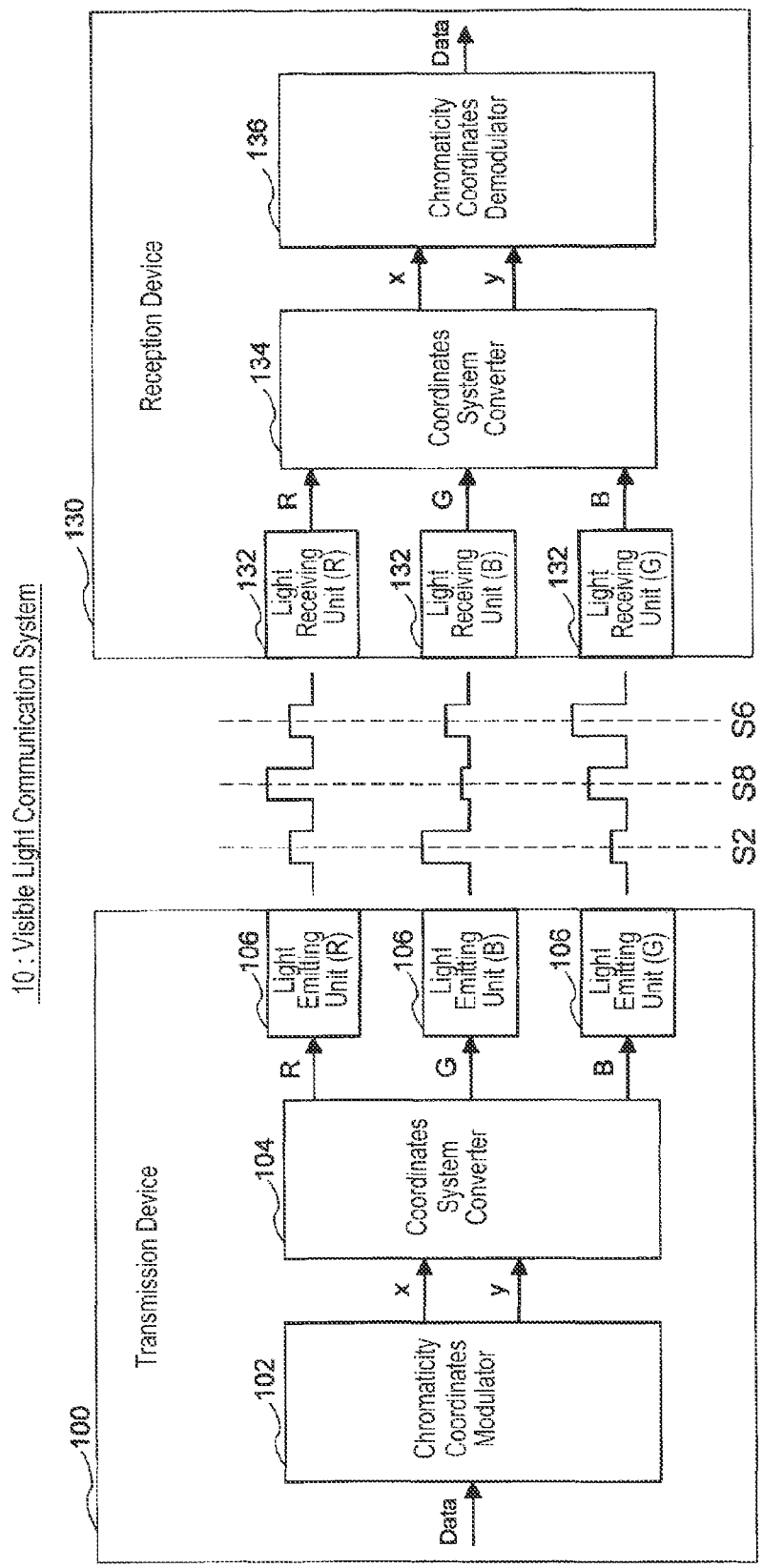
FIG. 1 is a block diagram illustrating a construction of a visible light system in relation to a chromaticity coordinates multiplexing scheme.

Hereinafter, exemplary embodiments of the present invention will be described with reference to the accompanying drawings. In the following description, the same elements will be designated by the same reference numerals although they are shown in different drawings, and the repeated description for the same reference numeral will be omitted.

Here, the flow of the description of an embodiment of the present invention to be described below will be briefly described. First, a visible light communication method according to a chromaticity coordinates multiplexing scheme will be described with reference to FIGS. 1 to 4. In the description, a technical problem of a visible light communication system 10 based on the conventional chromaticity coordinates multiplexing scheme will be described. Then, a construction and an effect of a visible light communication system 20 according to an embodiment of the present invention will be described in detail with reference to FIGS. 5 to 10.

The construction of the visible light communication system 10 according to the chromaticity coordinates multiplexing scheme will be described with reference of FIG. 1. The visible light communication system 10 is characterized by a construction in which input data is mapped to a chromaticity point on chromaticity coordinates of a color system and input data is multiplexed and transmitted with colored light corresponding to the chromaticity point. This multiple transmission scheme is referred to herein as a chromaticity coordinate multiplexing scheme.

As illustrated in FIG. 1, the visible light communication system 10 includes a transmission device 100 and a reception device 130. The transmission device 100 maps data to a predetermined chromaticity point and transmits the mapped data to the reception device 130. The reception device 130 compares a color of light received from the transmission device 100 with a predetermined chromaticity point arranged on the chromaticity coordinates and demodulates the original input data. Hereinafter, the modulation process by the transmission device 100 and the demodulation process by the reception device 130 will be described in detail.

Modulation Process by Transmission Device 100

As illustrated in FIG. 1, the transmission device 100 includes a chromaticity coordinate modulator 102, a coordinate system converter 104, and multiple light emitting units 106. Further, each of the multiple light emitting units 106 includes a light source, such as an LED, and a driving circuit for driving the corresponding light source. Further, the coordinate system converter 104 includes a light emission controller, also referred to as a luminescence controller, for controlling a luminescence amount of each of the light emitting units 106.

Figure 2:
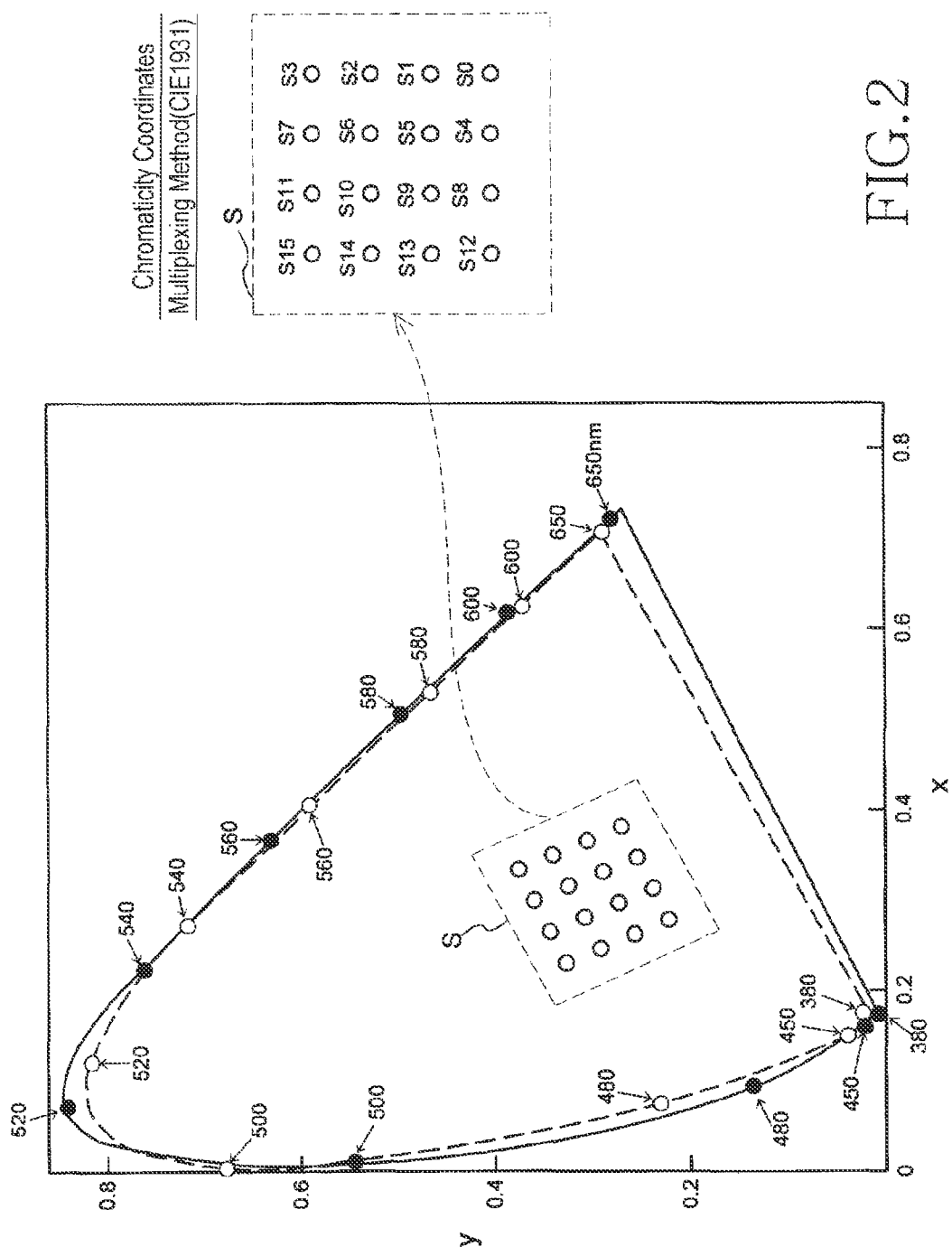
FIG. 2 is a graph illustrating a modulation method in a chromaticity coordinates multiplexing scheme.

First, the transmitted data is input to the chromaticity coordinate modulator 102. When the transmitted data is input to the chromaticity coordinate modulator 102, the chromaticity coordinate modulator 102 maps the input data (digital value) to a predetermined chromaticity point arranged on the chromaticity coordinates of a predetermined color system. The color system in which the chromaticity points are arranged is, for example, a CIE color system (RGB, XYZ(Yxy), L*u*v*, L*a*b*, etc.), as standardized by Commission Internationale de l'clairage (CIE), the Munsell color system, or the Ostwald color system. For example, the input data is mapped to the chromaticity point on the chromaticity coordinates, as illustrated in FIG. 2. However, the chromaticity coordinates illustrated in FIG. 2 is the Yxy color system.

In an example of FIG. 2, a predetermined chromaticity point arrangement (S) is set in the color system. The chromaticity point arrangement (S) exemplified in FIG. 2 is used when a digital value is 4-bit multiplexed (multiplicity=16). Therefore, the chromaticity point arrangement (S) exemplified in FIG. 2 includes 16 chromaticity points, S0 to S15. The chromaticity points, S0 to S15 included in the chromaticity point arrangement (S) correspond to digital values, respectively, as illustrated in FIG. 3. In this respect, the chromaticity coordinate modulator 102 selects the chromaticity point between S0 and S15 corresponding to the input data (digital values). When the chromaticity point is selected by the chromaticity coordinate modulator 102, a chromaticity coordinate value (x, y) of the selected chromaticity point is input to the coordinate system converter 104. Further, information of the color system and the chromaticity point arrangement (S) are shared with the reception device 130 of FIG. 1.

Referring to FIG. 1 again, the chromaticity coordinate value (x, y) of the chromaticity point selected according to the input data by the chromaticity coordinate modulator 102 is input to the coordinate system converter 104. The coordinate system converter 104 calculates a mixing rate of the Red color (R), the Green color (G), and the Blue color (B) corresponding to the input chromaticity coordinate value (x, y). That is, the coordinate system converter 104 converts the color system into an RGB format and represents the chromaticity point selected by the chromaticity coordinate modulator 102 in the RGB format after the conversion. Further, the coordinate system converter 104 sets a driving voltage to be supplied to each of the light emitting units 106, which emit red light (R), green light (G), and blue light (B), based on the calculated mixing rate of the colors Red color (R), Green color (G), and Blue color (B). However, the driving voltage is set so that a total luminescence amount emitted from the multiple light emitting units 106 has a predetermined value.

In the meantime, in setting the driving voltage, the coordinate system converter 104 sets the driving voltage so that a multiplied luminescence amount emitted from each of the light emitting units 106 within a predetermined time has the mixing rate. Through the construction, even if the transmission device 100 is a lighting device corresponding to the PWM control, it is possible to remove the influence of the PWM control through matching the multiplied luminescence amount to the chromaticity coordinate value (x, y) in accordance with a PWM cycle. Information of the driving voltage, serving as a control signal, set by the coordinate system converter 104 as described above is input to each of the light emitting units 106 of the corresponding colors.

As described above, the transmission device 100 includes the light emitting unit 106 emitting red light (R), the light emitting unit 106 emitting green light (G), and the light emitting unit 106 emitting blue light (B). When a control signal of the driving voltage is input from the coordinate system converter 104, each of the light emitting units 106 is driven according to the control signal and emits the colored light of the corresponding color. For example, the light emitting unit 106 corresponding to the red color (R) emits the red light (R) according to the control signal of the driving voltage set based on the mixing rate of the red light (R). More specifically, the control signal is input to a driving circuit installed in each of the light emitting units 106 and the driving voltage is supplied to the light source, such as the LED, from the driving circuit, so that the light corresponding to each of the colors is generated. An example of the light source includes a semiconductor light emitting device, such as an LED, an LD, and an SLD, a fluorescent lamp, a Cathode Ray Tube (CRT) display device, a Plasma Display Panel (PDP) device, an organic Electroluminescent (EL) display device, and a Liquid Crystal Display (LCD).

As described above, the transmission device 100 maps the digital value of the input data to the chromaticity point coordinates and transmits the mapped value. Because of this, the transmission is not dependent on a type of light source. For example, in a white light spectrum of the LED, a sharp peak is observed in a frequency band of the red light (R), the green light (G), and the blue light (B). In the meantime, in a white light spectrum of a display device, a small peak is observed in a frequency band of the red light (R), the green light (G), and the blue light (B), but a generally wide distribution shape is observed. In a frequency modulation scheme or an amplitude modulation scheme, a difference between spectrum shapes is represented as a difference of demodulated data. In the meantime, in the chromaticity coordinate multiplexing scheme, the data is modulated and mapped on the chromaticity coordinates, so that even if the kind of light source is different, the data is identically demodulated. Therefore, various light emitting types can be used as light sources.

In the meantime, it is preferable to mount the multiple light sources on the light emitting unit 106. In this case, the light emitting unit 106 is configured so that the driving circuit included in the light emitting unit 106 commonly supplies the driving voltage to the multiple light sources according to the control signal. However, when the multiple light sources are mounted on the light emitting unit 106, it is preferable to configure the light emitting unit 106 so that the driving circuit included in the light emitting unit 106 controls the number of light emitting light sources in controlling a luminescence amount of the light emitting unit 106. By using the multiple light sources, it is possible to increase a strength of the light generated from the light emitting unit 106, irrespective of the type of light source.

The function and the construction of the transmission device 100 has been described. If construction of the transmission device 100 is applied, the data is transmitted using the chromaticity coordinates, allowing for modulation of the data with the multiple values larger than the number of light emitting units 106 included in the transmission device 100. Therefore, it is possible to increase a data quantity transmittable by a single pulse and transmit the higher-rate data. Further, the data is modulated in the mixing rate of the colored lights, so that it is possible to control the influence of the reduction of the luminescence amount generated in the propagation path and reduce a transmission error rate. Further, there is an advantage in that it is not necessary to select the type of light source. Further, the chromaticity coordinates simultaneously represent the color and saturation. Therefore, when the input data is mapped to the chromaticity coordinates and is modulated, it is possible to improve the multiplicity of the input data as much as a saturation portion.

A demodulation process by the reception device 130 is now described.

As illustrated in FIG. 1, the reception device 130 includes multiple light reception units 132, a coordinate system converter 134, and a chromaticity coordinate demodulator 136. The light reception unit 132 is formed with a color filter, a photoelectric converting device, and an Analog to Digital (A/D) converting circuit.

As described above, the multiple light emitting units 106 generate colored light corresponding to the input data transmitted from the transmission device 100 to the reception device 130. The multiple colored light generated from the multiple light emitting units 106 are mixed in the propagation path. The mixed colored light is received in the multiple light receiving units 132 included in the reception device 130. The light receiving unit 132 has a color filter with a specific spectral sensitivity characteristic. The mixed light received by the light receiving unit 132 is incident to the color filter and is separated into a predetermined light colors. The colored light passing the color filter enters a photoelectric converting device included in the light receiving unit 132. The photoelectric converting device outputs an electric current proportional to a quantity of received light of the colored light passing the color filter.

For example, the photoelectric converting device of the light receiving unit 132 corresponding to the red color (R) outputs the electric current proportional to a quantity of received light of the red light (R). Similarly, the photoelectric converting devices of the light receiving unit 132 corresponding to the green color (G) and the blue color (B) output the electric current proportional to a quantity of received light of the green light (G) and the blue light (B), respectively. In the meantime, an example of the photoelectric converting device includes a Photo Diode (PD), a pn-type PD, a pin-type PD, and an Avalanche Photo Diode (APD). The electric current output from the photoelectric converting device of the light receiving unit 132 is input to the A/D converting circuit of the light receiving unit 132. In the A/D converting circuit, a value of the electric current input from the photoelectric converting device is converted to brightness signals R, G, and B corresponding to the quantity of received light of each of the colored light. The brightness signal output from the A/D converting circuit is input to the coordinate system converter 134.

When the brightness signal of the colored light is input from the light receiving units 132, the coordinate system converter 134 converts the brightness signals R, G, and B corresponding to the colored light into the original chromaticity coordinate value (x, y). For example, in the Yxy color system, the coordinate system converter 134 calculates three stimuli values X, Y, and Z from the brightness signals R, G, and B using a color matching function representing a spectral sensitivity corresponding to sensitivity of the human eye and calculates the chromaticity coordinate value (x, y) from the calculated result. In the meantime, when a signal is transmitted from the transmission device 100 in accordance with the PMW cycle, the coordinate system converter 134 multiplies the brightness signals R, G, and B output from each of the light receiving units 132 during the single PWM cycle and calculates the chromaticity coordinate value (x, y) based on the multiplication value. The calculated chromaticity coordinate value (x, y) is input to the chromaticity coordinate demodulator 136.

When the chromaticity coordinate value (x, y) is input to the chromaticity coordinate demodulator 136, the chromaticity coordinate demodulator 136 demodulates the original transmission data based on the input chromaticity coordinate value (x, y). First, the chromaticity coordinate demodulator 136 calculates a distance between a predetermined chromaticity point (referring to FIG. 2) arranged on the chromaticity coordinate and the chromaticity coordinate value (x, y) and detects the predetermined chromaticity point closest to the chromaticity coordinate value (x, y). For example, when a digital value of the transmission date is 0×7, the chromaticity point S7 is detected if an influence of the noise, etc. in the propagation path is small. In this case, the chromaticity coordinate demodulator 136 outputs the digital value of 0×7 corresponding to the chromaticity point S7 with reference to the table of FIG. 3. Through this, the transmission data is demodulated.

As described above, the chromaticity coordinate value is calculated based on the quantity of the received light corresponding to each of the colors. Further, the original data is demodulated based on the calculated chromaticity coordinate value. Therefore, it is possible to control an increase in the transmission error rate by the reducing luminescence amount in the propagation path.

FIG. 1 provides an example of a luminescence timing and a luminescence amount (waveform) corresponding to chromaticity points S2, S8, and S6. As illustrated, the data corresponding to each of the chromaticity points are modulated as a ratio of luminescence amount generated from each of the light emitting units 106 and transmitted. Therefore, it is possible to improve the multiplicity up to a number equal to or larger than the number of light emitting units 106 while maintaining a strong resistance against reduction of luminescence in the propagation path. However, the influence of the ambient light cannot be ignored. Further, the spectrum of the light generated from each of the light emitting units 106 has a finite width, so that the influence of the interference (hereinafter, referred to as 'the RGB interference') of the colored light generated from the multiple light emitting units 106 also cannot be ignored. Further, when there is an unbalance (hereinafter, referred to as 'the RGB unbalance') of the light emitting strength among the multiple light emitting units 106, the transmission quality deteriorates due to the influence of the RGB unbalance.

The RGB unbalance is the result of band characteristics of the light emitting units 106 of the transmission device 100 and band characteristics of the light receiving units 132 of the reception device 130. Further, the RGB unbalance is the result of the light emitting strength characteristics of the light emitting units 106 of the transmission device 100 and light receiving sensitivity characteristics of the light receiving units 132 of the reception device 130. In regard to the above influences, the experimental results illustrated in FIG. 4 were obtained.

Figure 4:
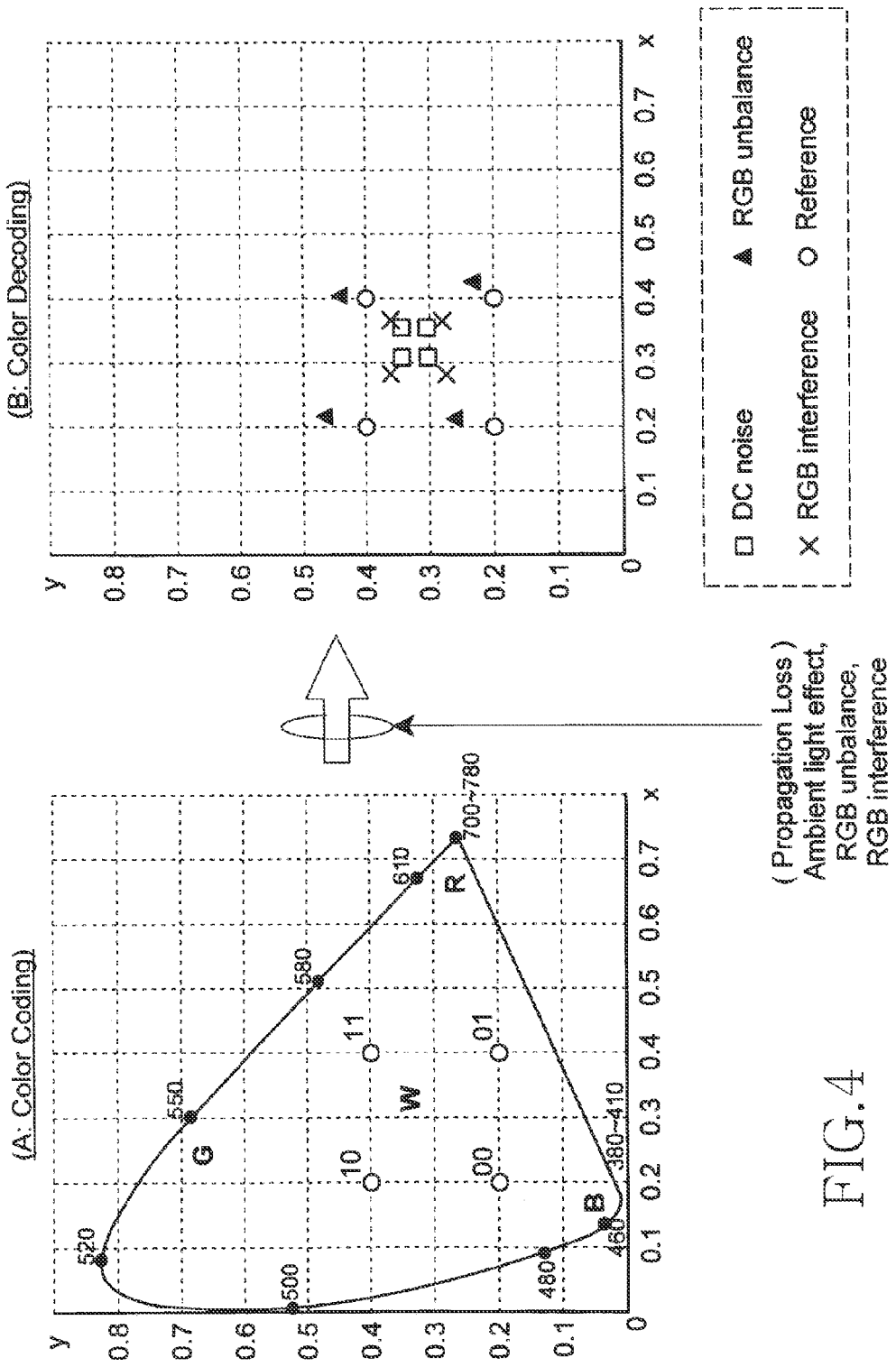
FIG. 4 illustrates experimental results of a chromaticity coordinate multiplexing scheme.

FIG. 4 illustrates a position of a chromaticity point detected in the reception device 130 when data is assigned to four chromaticity points arranged on the chromaticity coordinates every two bits and transmitted by Quadrature Phase Shift Keying (QPSK) modulation. Especially, FIG. 4 represents the detection results in the cases of (A) applying the ambient light (DC noise), (B) applying of the RGB interference, and (C) applying of the RGB unbalance. 'Reference' in FIG. 4 denotes a position of a reference point. Further, FIG. 4 is expressed in a form of the XYZ color system. Furthermore, the chromaticity coordinate value (x, y) of FIG. 4 was calculated based on the results X, Y, and Z obtained through converting the brightness signals R, G, and B corresponding to the luminescence amount received by each of the light receiving units 132 with Equation (1):

$$X=2.7689 \times R+1.7517 \times G+1.1302 \times B$$

$$Y=R+4.5907 \times G+0.0601 \times B$$

$$Z=0.0565 \times G+5.5943 \times B \quad (1)$$

Referring to the right side chart ("B: Color Decoding") in FIG. 4, it can be recognized that the result of the chromaticity points in the cases of (A) applying the ambient light (DC noise) and (B) applying of the RGB interference are greatly deviated from the reference points. Further, it can be recognized that the result of the chromaticity points in the case of (C) applying the RGB unbalance is spaced apart from the reference points. In the meantime, although it is not illustrated in FIG. 4, even when the influence of the luminescence amount reduction in the propagation path is applied, the chromaticity coordinate value (x, y) corresponding to the received luminescence amount at a position almost overlapped with the reference points is observed. Further, in the cases of (A) applying the ambient light (DC noise) and (B) applying the RGB interference, the distances between the four chromaticity points are decreased. In the meantime, although case (C) does not show a big change in the distances between the four chromaticity points, it is possible to notice a rotation in the square shape formed at the four chromaticity points. As described, even though the construction of the visible light communication system 10 is used, the transmission quality is deteriorated due to the influences shown in the cases (A) to (C).

In this regard, in the embodiment of the present invention as described below, a method for reducing the deterioration of the transmission quality generated by the above influence is provided.

Hereinafter, the first embodiment of the present invention will be described. The first embodiment is characterized in that a channel matrix representing a propagation characteristic of a light propagation path is estimated and the propagation characteristic of the light propagation path is compensated using the channel matrix, so that the deterioration of the transmission quality is reduced. Hereinafter, a construction of a visible light communication system 20 and a method for compensating for the propagation characteristic according to the embodiment of the present invention will be described.

Construction of a visible light communication system 20 according to the embodiment of the present invention will be described with reference to FIG. 5. The description of the elements substantially identical to those of the visible light communication system 10 illustrated in FIG. 1 will be omitted.

Figure 5:
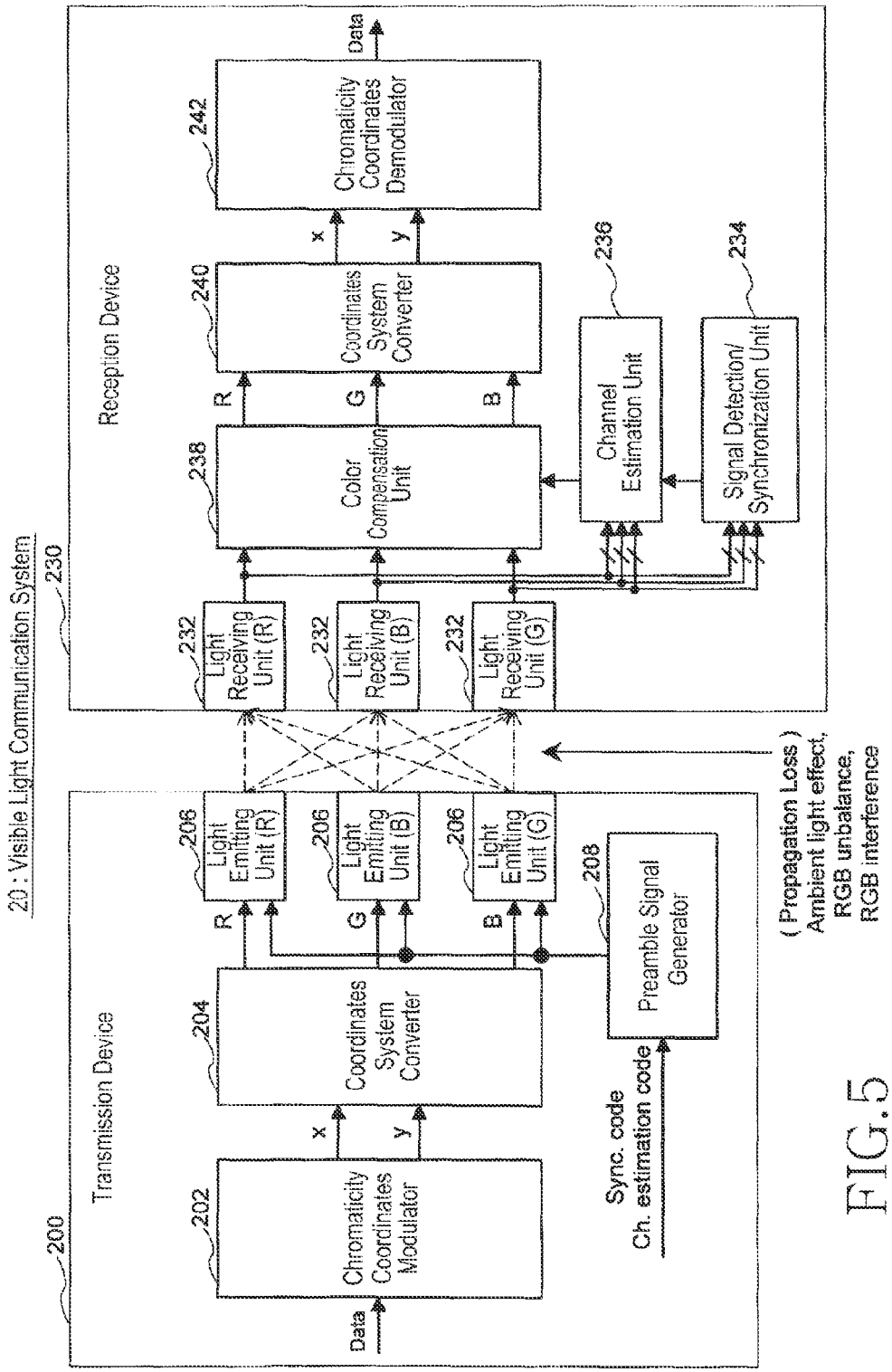
FIG. 5 is a block diagram illustrating a construction of a visible light communication system according to an embodiment of the present invention.

FIG. 5 a block diagram exemplarily illustrating the construction of the visible light communication system 20 according to an embodiment of the present invention. As illustrated in FIG. 5, the visible light communication system 20 includes a transmission device 200 and a reception device 230. A signal transmitted from the transmission device 200 is influenced by a reduced luminescence amount in the light propagation path, the mixing of ambient light, the RGB interference, and the RGB unbalance. Therefore, the visible light communication system 20 adopts a construction in which the reception device 230 compensates for the characteristic of the propagation path and detects transmission data with a brightness signal after the compensation. Hereinafter, the functions and the constructions of the transmission device 200 and the reception device 230 in relation to a method for compensating for the characteristic of the corresponding propagation path are described in detail.

The function and the construction of the transmission device 200 are described in regards to FIG. 5, in which transmission device 200 includes a chromaticity coordinate modulator 202, a coordinate system converter 204, a preamble signal generator 208, and multiple light emitting units 206. The chromaticity coordinate modulator 202 has the function and construction substantially identical to those of the chromaticity coordinate modulator 102 included in the transmission device 100. Further, the coordinate system converter 204 has the function and construction substantially identical to those of the chromaticity converter 104 included in the transmission device 100. Further, the multiple light emitting units 206 have the function and construction substantially identical to those of the light emitting units 106 included in the transmission device 100. Therefore, function and construction of the preamble signal generator 208 is described below.

As illustrated in FIG. 5, a synchronization code and a channel estimation code are input to the preamble signal generator 208. The synchronization code corresponds to a signal component used in a timing synchronization of the preamble signal by the reception device 230. Further, the channel estimation code corresponds to a signal component used in a channel estimation by reception device 230. The preamble signal generator 208 generates a preamble signal based on the input synchronization code and the input channel estimation code. An example of the preamble signal generated by the preamble signal generator 208 is illustrated in FIG. 6.

Figure 6:
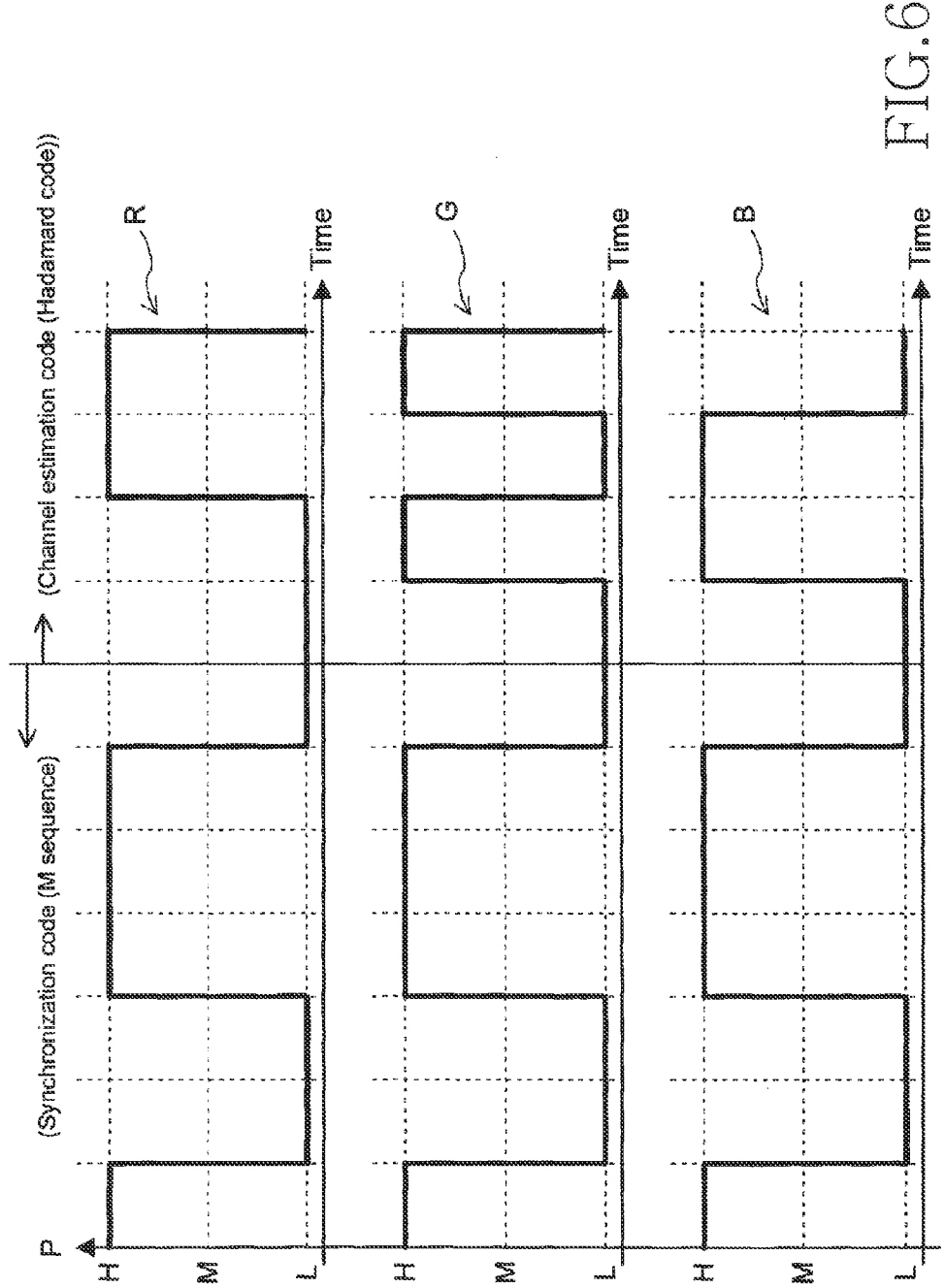
FIG. 6 is a graph illustrating a code type of a preamble signal according to an embodiment of the present invention.

As illustrated in FIG. 6, the preamble signal generated by the preamble signal generator 208 includes a synchronization code component and a channel estimation code component. Further, a preamble signal R is a control signal input to the light emitting unit 206 of the red light (R). Similarly, the preamble signals G and B are control signals input to the light emitting units 206 of the green light (G) and the blue light (B), respectively. In the synchronization code component, the signal waveforms of the preamble signals corresponding to the red light (R), the green light (G), and the blue light (B) are the same. Further, in the present embodiment, a Maximal-length (M) sequence signal having a satisfactory autocorrelation characteristic can be preferably used for the synchronization code component. On the contrary, a signal waveform having low cross-correlation is used for the channel estimation code component. Preferably, a Hadamard code can be used for the channel estimation code component.

Referring to FIG. 5, the preamble signal generator 208 generates the preamble signal including the synchronization code component with the satisfactory autocorrelation characteristic and the component of the channel estimation code having the satisfactory cross-correlation characteristic between the different colored light. The preamble signal corresponding to each of the colors is input to the light emitting unit 206 corresponding to each of the colors. Each of the light emitting units 206 emits light based on the preamble signal input from the preamble signal generator 208. Further, the transmission of the preamble signal is performed before the transmission of the transmission data input to the chromaticity coordinate modulator 202. That is, the preamble signal is transmitted, the channel matrix is estimated by the reception device 230, and then the transmission data is transmitted. The transmission data is mapped to a chromaticity point by the chromaticity coordinate modulator 202, is converted to the RGB signal by the coordinate system converter 204, and is transmitted by the multiple light emitting units 206, likewise to the case of the visible light communication system 10.

The function and construction of the reception device 230 is now described. As illustrated in FIG. 5, the reception device 230 includes multiple light reception units 232, a signal detection/synchronization unit 234, a channel estimation unit 236, a color compensation unit 238, a coordinate system converter 240, and a chromaticity coordinate demodulator 242. The main difference between the reception device 230 and the reception device 130 is the construction and the construction of the signal detection/synchronization unit 234, the channel estimation unit 236, and the color compensation unit 238. In the meantime, the light receiving units 232, the coordinate system converter 240, and the chromaticity coordinate demodulator 242 are substantially the same as the light receiving units 132, the coordinate system converter 134, and the chromaticity coordinate demodulator 136 of the reception device 130, as described in regards to FIG. 1. Therefore, the signal detection/synchronization unit 234, the channel estimation unit 236, and the color compensation unit 238 are described below.

First, when the preamble signal is transmitted from the transmission device 200, the reception device 230 receives the preamble signal by using the multiple light receiving units 232. However, a reduced luminescence amount, mixing of ambient light, RGB interference, and RGB unbalance occur in the propagation path, so that a signal received in each of the light receiving units 232 includes characteristics of the propagation path in addition to the characteristic of the original preamble signal. A brightness signal of the light received in each of the light receiving units 232 is input to the signal detection/synchronization unit 234 and the channel estimation unit 236. The signal detection/synchronization unit 234 can use only a signal component corresponding to the component of the synchronization code of the preamble signal. Likewise, the channel estimation unit 236 can use only a signal component corresponding to the component of the channel estimation code of the preamble signal.

The function and the construction of the signal detection/synchronization unit 234 is now described. The signal detection/synchronization unit 234 establishes a timing synchronization based on the signal component (hereinafter, 'the synchronization code component') corresponding to the component of the synchronization code of the preamble signal among the input brightness signals. As described above, the synchronization code has a signal waveform having the satisfactory autocorrelation characteristic. Therefore, the signal detection/synchronization unit 234 can use a code identical to the synchronization code used in the preamble signal generator 208 of the transmission device 200, execute a sliding correlation, and detect an autocorrelation peak. Further, the existence and a position of the signal are detected according to the detected autocorrelation peak. The position of the signal detected by the signal detection/synchronization unit 234 is provided to the channel estimation unit 236.

Figure 7:
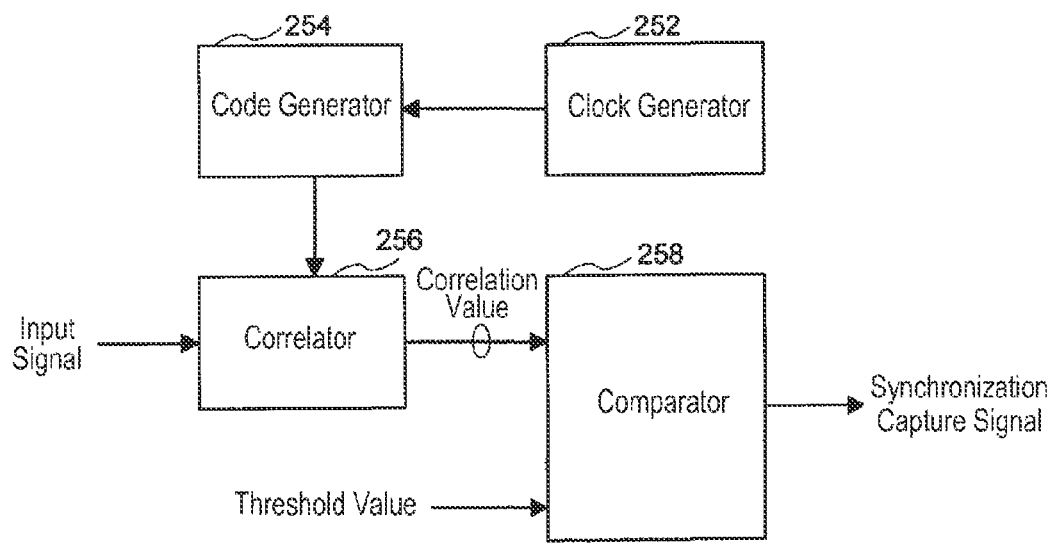
FIG. 7 is a block diagram illustrating a construction of a signal detection/synchronization unit according to an embodiment of the present invention.

Hereinafter, the construction of the signal detection/synchronization unit 234 is further described with reference to FIG. 7, which is a block diagram illustrating the construction of the signal detection/synchronization unit 234. As illustrated in FIG. 7, the signal detection/synchronization unit 234 includes a clock generator 252, a code generator 254, a correlator 256, and a comparator 258.

The code generator 254 generates a code identical to the synchronization code input to the preamble signal generator 208 of the transmission device 200 by using a clock signal generated in the clock generator 252. For example, the code generator 254 generates an M sequence synchronization code. The synchronization code generated in the code generator 254 is input to the correlator 256. An input signal (brightness signal) is also input to the correlator 256. The correlator 256 outputs a correlation value at each time interval while sliding a timing of the synchronization code generated in the code generator 254 and a timing of the input signal. The correlation value output by the correlator 256 is input to the comparator 258. The comparator 258 determines if the correlation value output from the correlator 256 is larger than a predetermined threshold value. When the correlation value output from the correlator 256 is larger than the predetermined threshold value, the comparator 258 determines that the synchronization capture is completed and outputs a synchronization capture signal. The synchronization capture signal reports the existence and position of the signal to the channel estimation unit 236. Through the process, the timing synchronization of the signal is realized.

Referring to FIG. 5, the function and the construction of the channel estimation unit 236 is described. The channel estimation unit 236 estimates a channel matrix (H) according to a signal component (hereinafter, 'the channel estimation code component') corresponding to the component of the channel estimation code of the preamble signal. As such, the position, i.e. timing, of the signal is notified from the signal detection/synchronization unit 234 to the channel estimation unit 236. Therefore, the channel estimation unit 236 calculates a correlation value of the channel estimation code component in accordance with the timing detected by the signal detection/synchronization unit 234. For example, when the Hadamard code is used, the autocorrelation value is 1 and a cross-correlation value is 0. Therefore, by using the construction illustrated in FIG. 8, as described below, each component of the channel matrix H is calculated.

Figure 8:
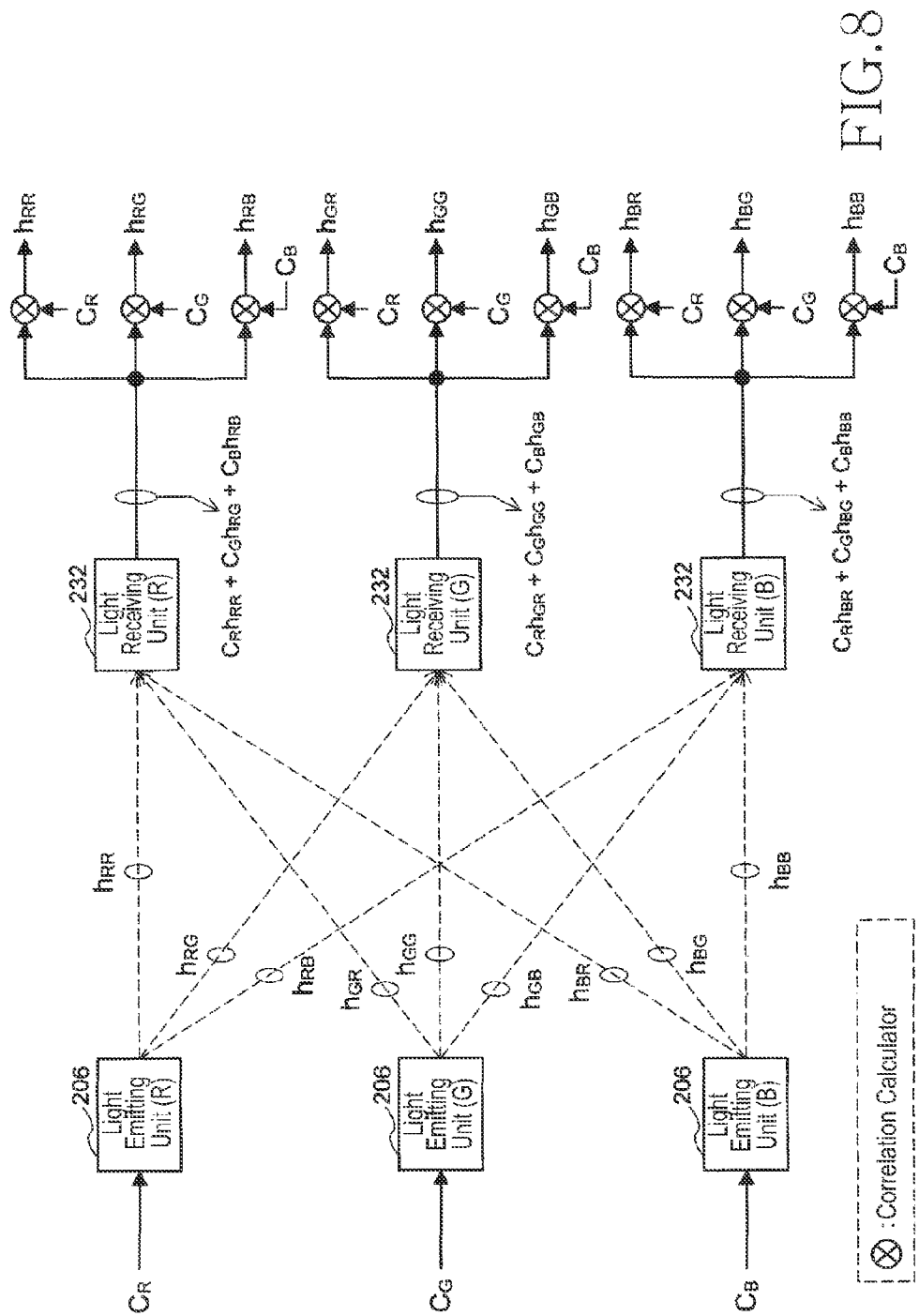
FIG. 8 illustrates a construction of a channel estimation unit according to an embodiment of the present invention.

In FIG. 8 an optical signal transmitted from each of the light emitting units 206 of the transmission device 200 is mixed in the propagation path and is incident to the light receiving units 232. Further, in FIG. 8 each component of the channel matrix H is detected from the brightness signal corresponding to the light received in each of the light receiving units 232. The signals transmitted from the multiple light emitting units 206 are expressed as $C_R$, $C_G$, and $C_B$, respectively. Further, the components of the channel matrix H corresponding to the propagation path between each of the light emitting units 206 and each of the light receiving units 232 are expressed as $h_{I,J}$, respectively, wherein I and J are respective values of R, G, and B, with 'I' corresponding to the color of the light emitting unit 206 and 'J' corresponding to the color of the light receiving unit 232. For example, the component of the channel matrix H corresponding to the propagation path between the light emitting unit 206 of the red color (R) and the light receiving unit 232 of the blue color (B) are expressed in a form of $h_{RB}$.

A method for detecting components $h_{RR}$, $h_{RG}$, and $h_{RB}$ of the channel matrix H based on the brightness signal output from the light receiving unit 232 of the red color (R) is now specifically described. As illustrated in FIG. 8, the light (green light (G) and blue light (B)) generated in the light emitting unit 206 of the green color (G) and the light emitting unit 206 of the blue color (B) are incident to the light receiving unit 232 of the red color (R), as well as the red light (R) generated from the light emitting unit 206 of the red color (R).

However, the color filter that allows the red light (R) to pass is installed in the light receiving unit 232 of the red color (R). To be exact, the green light (G) and the blue light (B) are blocked by the color filter. However, the light emitting unit 206 of the green color (G) and the spectrum of the light generated from the light emitting unit 206 of the blue color (B) is of finite width, and the red light (R) component is also included in the light generated from the light emitting unit 206 of the green color (G) and the light emitting unit 206 of the blue color (B). Further, the color filter included in the light receiving unit 232 of the red color (R) cannot completely separate the green light (G) and the blue light (B). Therefore, components in addition to the red light (R) generated from the light emitting unit 206 of the red color (R) are included in the strength of the light detected in the light receiving unit 232 of the red color (R). The influences of the components are expressed in FIG. 8 as $h_{RR}$, $h_{GR}$, and $h_{BR}$.

When the brightness signal output from the light receiving unit 232 of the red color (R) is expressed as $C'_R$, the brightness signal $C'_R$ can be expressed by Equation (2). Likewise, the brightness signal $C'_G$ output from the light receiving unit 232 of the green color (G) can be expressed by Equation (2). Further, the brightness signal $C'_B$ output from the light receiving unit 232 of the blue color (B) can be expressed by Equation (2). Finally, the channel matrix H can be expressed by Equation (3).

Equation (2) is: (2)
$$C'_R = C_R \times h_{RR} + C_G \times h_{RG} + C_B \times h_{RB}$$
$$C'_G = C_R \times h_{GR} + C_G \times h_{GG} + C_B \times h_{GB}$$
$$C'_B = C_R \times h_{BR} + C_G \times h_{BG} + C_B \times h_{BB}$$

Equation (3) is: (3)
$$H = \begin{pmatrix} h_{RR} & h_{RG} & h_{RB} \\ h_{GR} & h_{GG} & h_{GB} \\ h_{BR} & h_{BG} & h_{BB} \end{pmatrix}$$

A method of detecting the components, $h_{RR}$, $h_{GR}$, and $h_{BR}$, of the channel matrix H expressed in Equation (2) is provided. As described above, the channel estimation unit 236 estimates each of the components of the channel matrix H based on the channel estimation code component among the received brightness signals. Therefore, for the description focusing on the channel estimation code component, it is assumed that the signals $C_R$, $C_G$, and $C_B$ represent the channel estimation code components.

The brightness signal $C'_R$ is input to each of three kinds of correlation calculators 260, as illustrated in FIG. 8, with signals $C_R$, $C_G$, and $C_B$ being input to the respective correlation calculators 260. The correlation calculator 260, to which the signal $C_R$ is input, executes a correlation calculation between the brightness signal $C'_R$ and the signal $C_R$. When the Hadamard code is used for the channel estimation code, the autocorrelation value is 1 and the cross-correlation value is 0, as described above. Therefore, the correlation calculator 260, to which the signal $C_R$ is input, extracts only the component $h_{RR}$ corresponding to the correlation value of 1 from the brightness signal $C'_R$. Likewise, the component $h_{RG}$ of the channel matrix H is extracted by the correlation calculator 260, to which the signal $C_G$ is input, and the component $h_{RB}$ of the channel matrix H is extracted by the correlation calculator 260, to which the signal $C_B$ is input.

A method for calculating each component of the channel matrix H from the brightness signal $C'_R$ of the light receiving unit 232 of the red color (R) has been described above. Similarly, it is possible to calculate each component of the channel matrix H from the brightness signals $C'_G$ and $C'_B$ of the light receiving unit 232 of the green color (G) and the light receiving unit 232 of the blue color (B). That is, the channel estimation unit 236 can estimate the channel matrix H through the above method. Further, attention should be paid to the fact that the calculated channel matrix H includes the light emitting characteristics of the light emitting units 206, and the influences of the luminescence amount reduction in the propagation path, the RGB interference, and the RGB unbalance.

FIG. 5 is again referred to, assuming that signals $C_R$, $C_G$, and $C_B$ are not limited to the preamble signal. The channel matrix H estimated by the channel estimation unit 236 is input to the color compensation unit 238. Further, the brightness signal is input from each of the light receiving units 232 to the color compensation unit 238. When the brightness signal is input to the color compensation unit 238, the color compensation unit 238 compensates the brightness signal for the propagation path by using the channel matrix H input from the channel estimation unit 236. For example, the color compensation unit 238 employs a Zero Focusing (ZF) method as a compensation for the propagation path. The ZF method has an advantage in that a quantity of the calculation is less than that of another method. However, the application scope of the technology according to the embodiment of the present invention is not limited to the ZF method.

The ZF method is used to cancel the characteristic of the propagation path expressed in the form of the channel matrix H from the received signal. Especially, in the ZF method, a weight matrix W expressed by Equation (4) is used. First, the color compensation unit 238 uses the channel matrix H estimated by the channel estimation unit 236 and calculates the weight matrix W expressed by Equation (4). Next, the color compensation unit 238 multiplies the calculated weight matrix W with a brightness signal vector $C'=(C'_R, C'_G, \text{ and } C'_B)^T$ and detects an original signal vector $C=(C_R, C_G, \text{ and } C_B)^T$ as expressed in Equation (4):

$$W = (H \times H^H)^{-1} \times H^H \qquad (4)$$
$$C = W \times C'$$
$$= W \times H \times C$$
$$= (H \times H^H)^{-1} \times (H^H \times H) \times C$$
$$= C$$

Herein, the upper suffix H means a Hermitian codomain. In the present embodiment, each of the components of the channel matrix H estimated by the channel estimation unit 236 is a real number, so that the Hermitian matrix is a symmetric matrix. Therefore, the fifth equal sign (=) in Equation (4) is established. Further, the matrix is a real number operation, so that the process load is smaller than an operation using a complex number and the high-rate operation can be executed. The third equal sign (=) in Equation (4) is expressed by Equation (2). Further, in Equation (4), in order to perform the multiplication process between the matrixes, the multiplication symbol ⌈x⌋ is intentionally used to aid the clear understanding.

When the compensation process based on the ZF method is executed, the brightness signal after the execution of the compensation process is input to the coordinate system converter 240 from the color compensation unit 238. The coordinate system converter 240 converts the RGB signal to the chromaticity value (x, y) similar with the operation of the coordinate system converter 134 of the reception device 130. The chromaticity coordinate value (x, y) after the conversion by coordinate system converter 240 is input to the chromaticity coordinate demodulator 242. The chromaticity coordinate demodulator 242 detects the chromaticity point closest to the input chromaticity coordinate value (x, y) and outputs data corresponding to the detected chromaticity point, similar with the operation of the chromaticity coordinate demodulator 136 of the reception device 130.

In the above, the construction of the visible light communication system 20 according to the embodiment of the present invention has been described. As discussed above, the visible light communication system 20 is characterized in the construction of estimating the channel matrix by using the preamble signal and compensating for the propagation path by using the channel matrix. Especially, the visible light communication system 20 is characterized in the construction of the execution of the timing synchronization and the channel estimation using the preamble signal including the component of the synchronization code of a high autocorrelation and the component of the channel estimation code of a high cross-correlation (low auto correlation). Further, the purpose of the present invention is the removal of negative influences created by mixing of ambient light, RGB interference, and RGB unbalance, so that the use of the ZF method, in which the operation load for the compensation for the propagation path is small, is one of the characteristics of the visible light communication system 20 of the present invention. It is a matter of course that the visible light communication system 20 is characterized in that the data is mapped to the chromaticity coordinates and is transmitted, and the influence of the reduction of the luminescence amount in the propagation path is reduced to a degree that the influence is ignorable. Through the combination of the above characteristics, it is possible to obtain the substantial effects illustrated in FIGS. 9 and 10, as discussed below.

Figure 9:
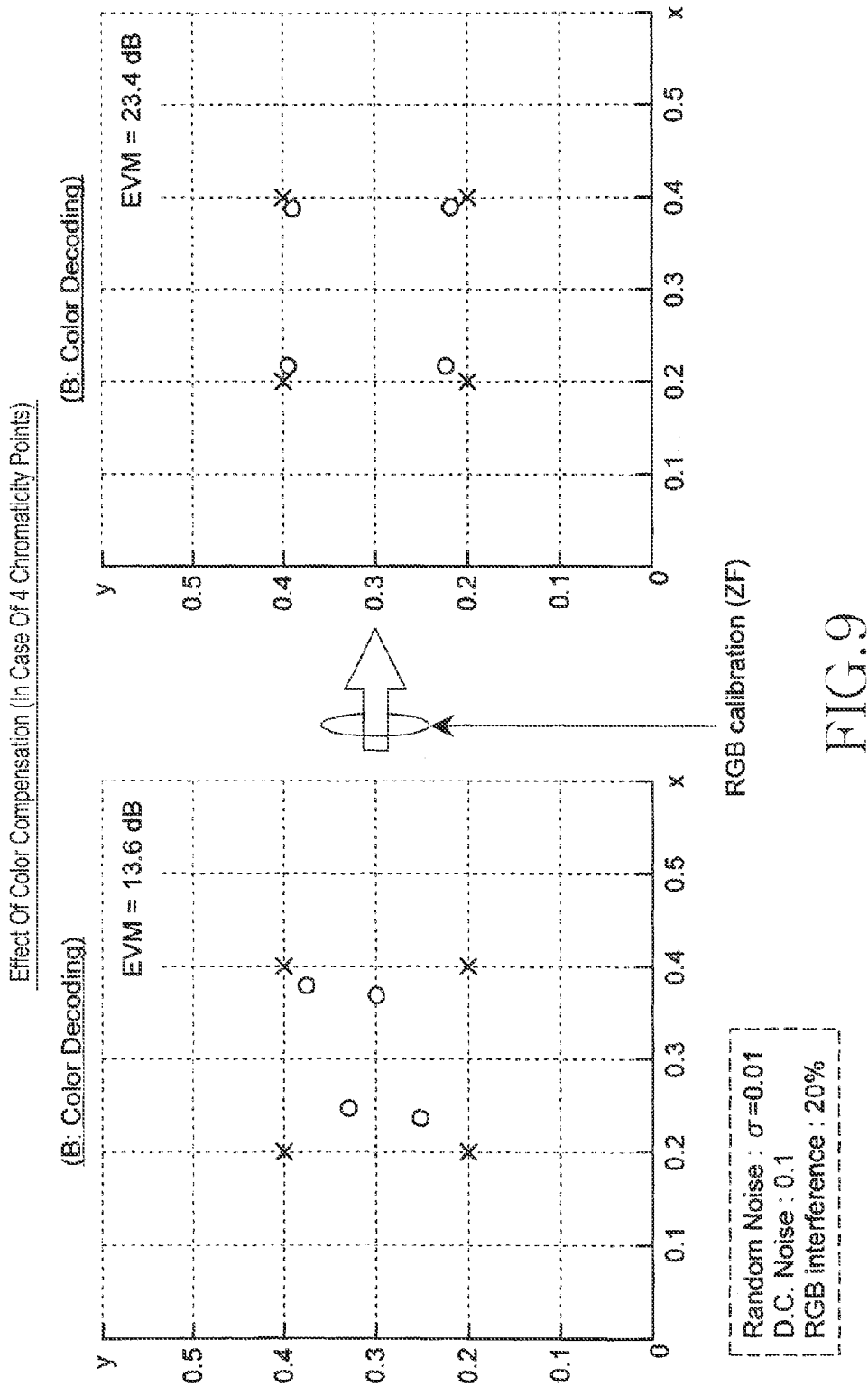
FIG. 9 provides graphs illustrating an effect obtainable by a color compensation process according to an embodiment of the present invention.

FIG. 9 illustrates reception results obtainable when four chromaticity points are set on the chromaticity coordinates serving as the reference points and the signals corresponding to the four chromaticity points are transmitted. The left-side chart in FIG. 9 illustrates a reception result obtainable when the light propagation path is not compensated in the visible light communication system 10. It can be accurately recognized from the left-side drawing in FIG. 9 that the distances between the four chromaticity points become narrow and simultaneously the square shaped. The four chromaticity points are distorted and rotate due to the influence of the characteristic of the propagation path. As a result, most of the chromaticity points detected from the reception signals greatly deviate from the reference points. Further, when an Error Vector Magnitude (EVM) was calculated in this case, a value EVM=13.6 dB was obtained.

The right-side chart of FIG. 9 is a reception result obtainable when the light propagation path is compensated in the visible light communication system 20. It can be accurately recognized from the right-side drawing in FIG. 9 that the influence of the characteristic of the propagation path is greatly reduced by the compensation process, so that the positions of the chromaticity points detected from the reception signals mostly accord with the positions of the reference points. Further, when the EVM was calculated in this case, a value EVM=23.4 dB was obtained. That is, the compensation for the light propagation path is executed to the reception signal, so that the EVM improved by about 10 dB.

Figure 10:
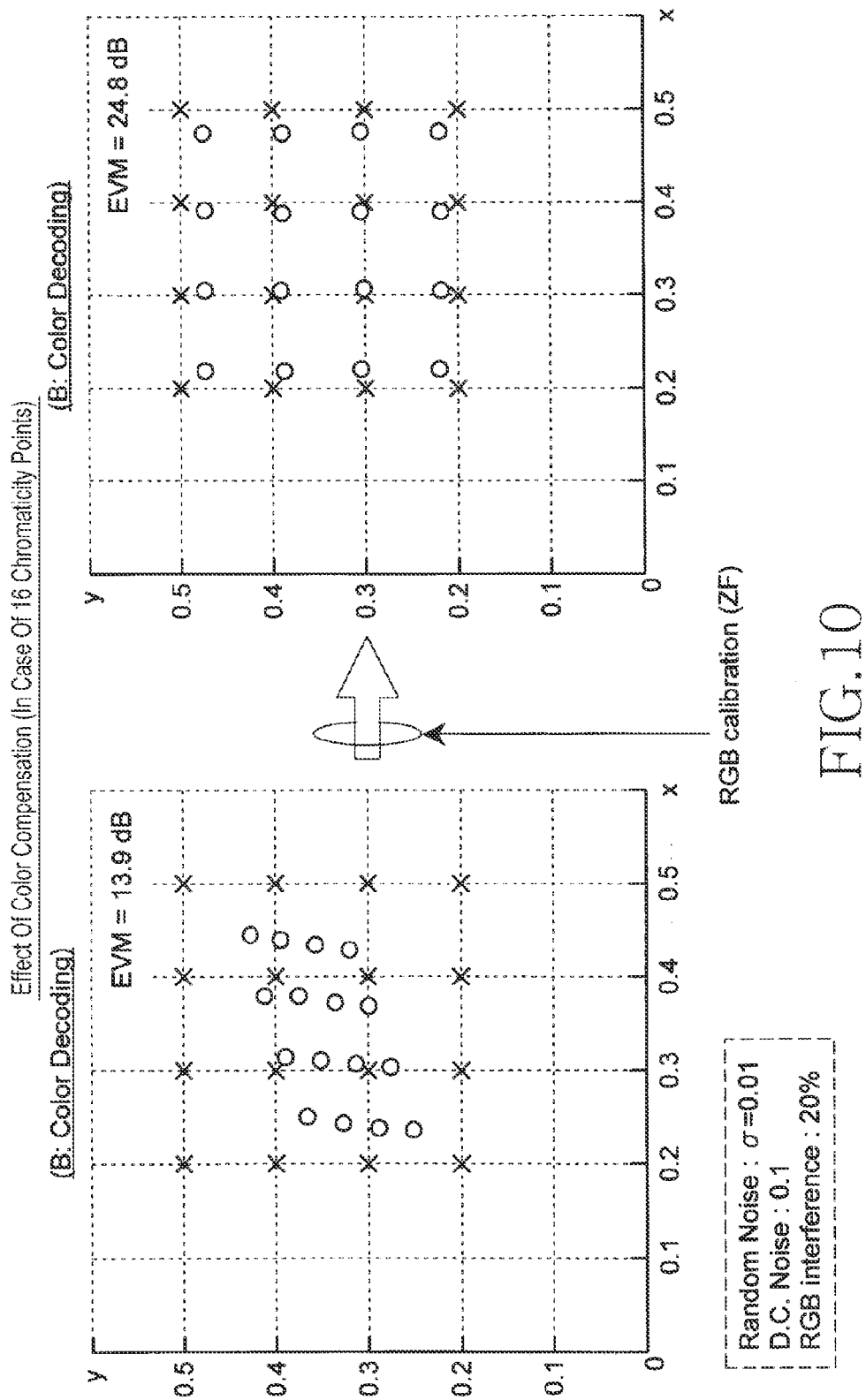
FIG. 10 provides graphs illustrating an effect obtainable by a color compensation process according to an embodiment of the present invention.

FIG. 10 similarly illustrates a comparison between the reception results when compensation for the light propagation path is executed to the reception signal and compensation for the light propagation path is not executed to the reception signal for 16 chromaticity points, serving as the reference points, are set on the chromaticity coordinates. It can be accurately recognized from FIG. 10 that the effect of the compensation process for the light propagation path is large and the EVM is improved at least 10 dB, similar with the case of FIG. 9.

As described above, by using the technology according to the embodiment of the present invention, it is possible to greatly improve the transmission quality in the visible light communication. Further, the technology according to the embodiment of the present invention is the method of adding the preamble signal to the data in advance, transmitting the data with the preamble signal, and calculating the channel matrix based on the preamble signal, and executing the compensation for the light propagation path by using the calculated channel matrix. Therefore, there is a concern in that the transmission rate is slightly down due to the addition of the preamble signal. In this respect, the influence of the decrease of the transmission rate caused by the addition of the preamble signal will be thought.

For example, a wireless LAN-type application is assumed. In this case, the transmission signal has a frame structure, and the compensation for the light propagation path according to the present embodiment is executed every transmission of a single frame. For example, it is assumed that a data length within the single frame is 512 symbols, which complies with VLCC-STD-003 standard of visible light ID systems.

Further, it is assumed that the M-sequence of cycle 7 is used in the synchronization code. On an assumption of the propagation path having the many noises, it is advantageous to use the M sequence having the long cycle. However, for visible light communication, there are many communications within the network having a comparatively high SN ratio, so that the M-sequence of cycle 7 is sufficient. However, in order to increase the accuracy of the signal detection, the same code is repeated three times. In this case, a signal length of the synchronization code component is 7*3=21 symbols. Further, it is assumed that the channel estimation code can use the Hadamard code of cycle 4. Conventionally, the code lengths for obtaining an orthogonality according to the multiple color numbers are different, but the three numbers of the RGB have been assumed in the present invention, so that it is possible to obtain the orthogonality by the Hadamard code of cycle 4. Therefore, the signal length of the channel estimation code component is 4 symbols.

Based on the assumption, the length of the preamble signal is 21+4=25 symbols. When the preamble signal is added to a leading part of each of the frames, it is possible to estimate a decreased transmission rate of about 25/512*100=4.9%. That is, it can be identified that when the present embodiment is applied, the deterioration of the transmission rate generated is small, as much as 5% or less, and the effect of the performance improvement is excessively sufficient to supplement the influence of the deterioration of the transmission rate. As described above, the visible light communication system 20 according to the embodiment of the present invention can efficiently remove the influence of the luminescence amount reduction in the propagation path, the ambient light, the RGB interference, and the RGB unbalance, so that it is possible to obtain the very excellent transmission quality close to the actual execution environment.

The foregoing are merely an exemplary embodiments of the technical spirit of the present invention and it will be readily understood by those skilled in the art that various modifications and changes can be made thereto within the technical spirit and scope of the present invention. Thus, the exemplary embodiment disclosed in the present invention is not for limiting the technical sprit, but for describing it, and the present invention is not limited thereto. The protection scope of the present invention shall be interpreted by the appended claims and every technical sprit within its equivalent scope shall be understood to be included in the claims of the present invention.

What is claimed is:

1. A transmission device for Visible Light Communication (VLC), the transmission device comprising:
    a controller configured to modulate transmission data with a combination of colors emitted from each of multiple light emitting units configured to emit different colors of light, to calculate a luminescence amount of each of the multiple light emitting units,
    to generate a preamble signal using an estimation of a channel matrix, and
    to control the luminescence amount of each of the multiple light emitting units based on the generated preamble signal.

2. The transmission device as claimed in claim 1, wherein the controller is configured to match the transmission data to a predetermined chromaticity point arranged on chromaticity coordinates, and to calculate
    the luminescence amount of each of the multiple light emitting units so that a color corresponding to the predetermined chromaticity point matching the transmission data is radiated.

3. The transmission device as claimed in claim 1,
    wherein the preamble signal comprises a synchronization code component used for a timing synchronization and a channel estimation code component, which is used for channel estimation,
    wherein the controller is configured to generate the preamble signal corresponding to each of the multiple light emitting units, and to control
    each of the multiple light emitting units based on the corresponding preamble signal,
    wherein the synchronization code component of the preamble signal corresponding to one light emitting unit and the synchronization code component of the preamble signal corresponding to another light emitting unit are identical, and
    wherein the channel estimation code component of the preamble signal corresponding to one light emitting unit and the channel estimation code component of the preamble signal corresponding to another light emitting unit are orthogonal with each other.

4. A reception device for Visible Light Communication (VLC), the reception device comprising:
    a controller configured to estimate a channel matrix based on a corresponding optical signal if an optical signal corresponding to a preamble signal is received by each of multiple light receiving units configured to receive optical signals of different colors,
    to compensate the corresponding optical signal for a propagation path based on the estimated channel matrix if an optical signal corresponding to a combination of colors is received by the multiple light receiving units,
    to detect the combination of colors, and to demodulate transmission data based on the compensated optical signal.

5. The reception device as claimed in claim 4, wherein the controller is configured to compensate the corresponding optical signal for the propagation path based on the estimated channel matrix if the optical signal corresponding to a predetermined chromaticity point is received in each of the multiple light receiving units,
    to detect the predetermined chromaticity point arranged on chromaticity coordinates, and to demodulate the transmission data based on the output signal.

6. The reception device as claimed in claim 4, wherein the controller is configured
    to generate a sample signal having a waveform identical to a waveform of a synchronization code component of the preamble signal, to calculate a correlation value while sliding a timing of an optical signal received in each of the light receiving units and a timing of the sample signal on each other, and
    to detect if the calculated correlation value exceeds a predetermined value.

7. The reception device as claimed in claim 4, wherein the controller is configured to apply a weight matrix calculated based on the channel matrix to the optical signal, and to compensate the corresponding signal for the propagation path.

8. The reception device as claimed in claim 7, wherein the weight matrix is:

$$W = (H \times H^H)^{-1} \times H^H,$$

wherein H is the channel matrix.

9. A visible light communication method in a transmission device having multiple light emitting units that emit different color light, the method comprising:
    modulating transmission data in combination with a color emitted from each of the multiple light emitting units and calculating a luminescence amount of each of the multiple light emitting units so that a combination of corresponding colors are radiated;
    generating a preamble signal using an estimation of a channel matrix; and
    controlling the luminescence amount of each of the multiple light emitting units based on the generated preamble signal simultaneously emitted from each of the multiple light emitting units according to the calculated luminescence amount.

10. A visible light communication method in a reception device having multiple light receiving units that receive optical signals corresponding to different emitted colors, the method comprising:
    estimating a channel matrix based on a corresponding optical signal if an optical signal corresponding to a preamble signal is received by each of the multiple light receiving units;
    compensating the corresponding optical signal for a propagation path based on the estimated channel matrix when an optical signal corresponding to a combination of colors is received by each of the multiple light receiving units;
detecting the combination of colors based on the optical signal of the propagation path; and
demodulating transmission data based on the detected combination of colors.

11. The transmission device as claimed in claim 1, wherein the multiple light emitting units are configured to radiate a combined color corresponding to the combination of corresponding colors, and to simultaneously emit signals according to the luminescence amount calculated by the controller.

* * * * *